Patented Aug. 22, 1944

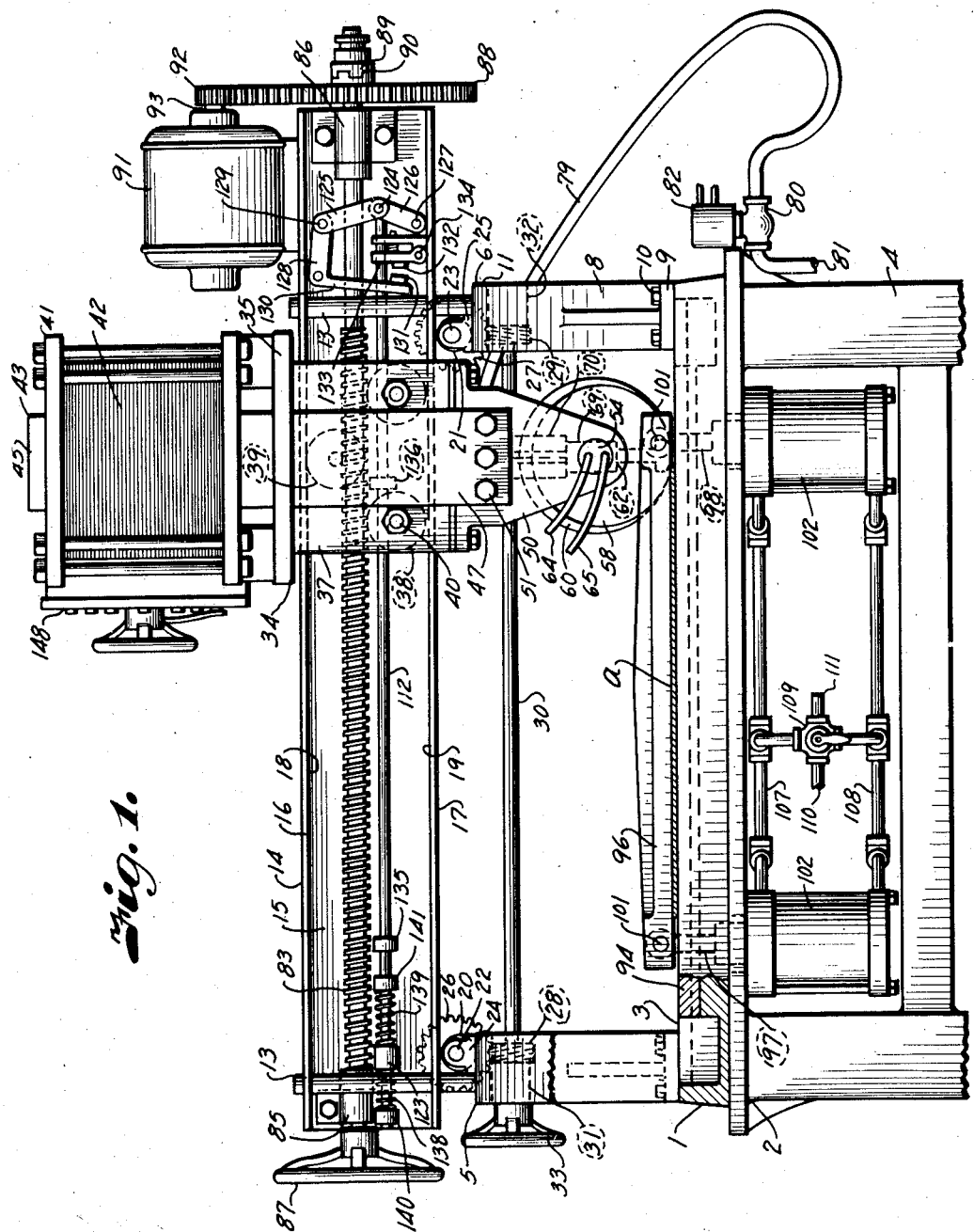

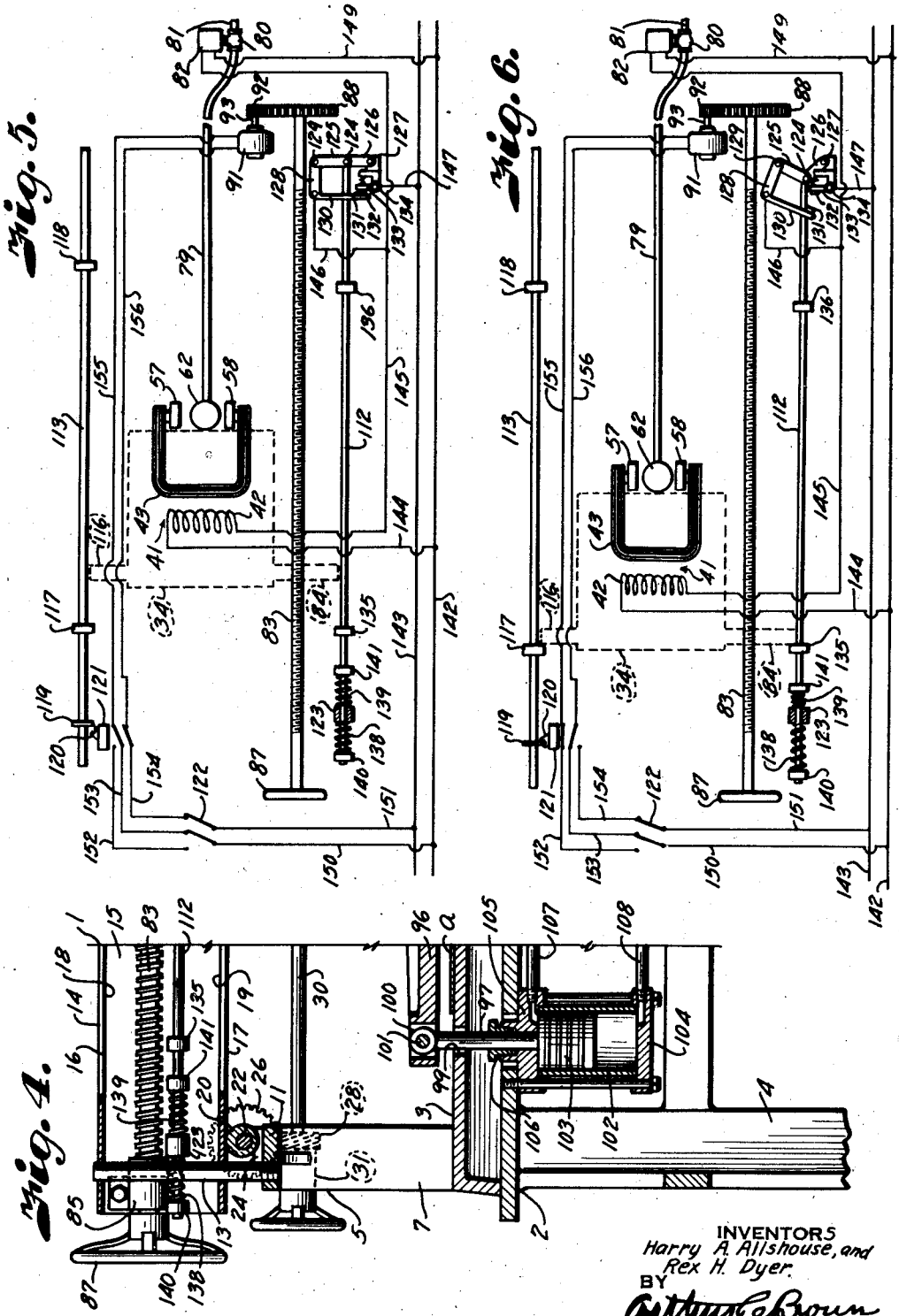

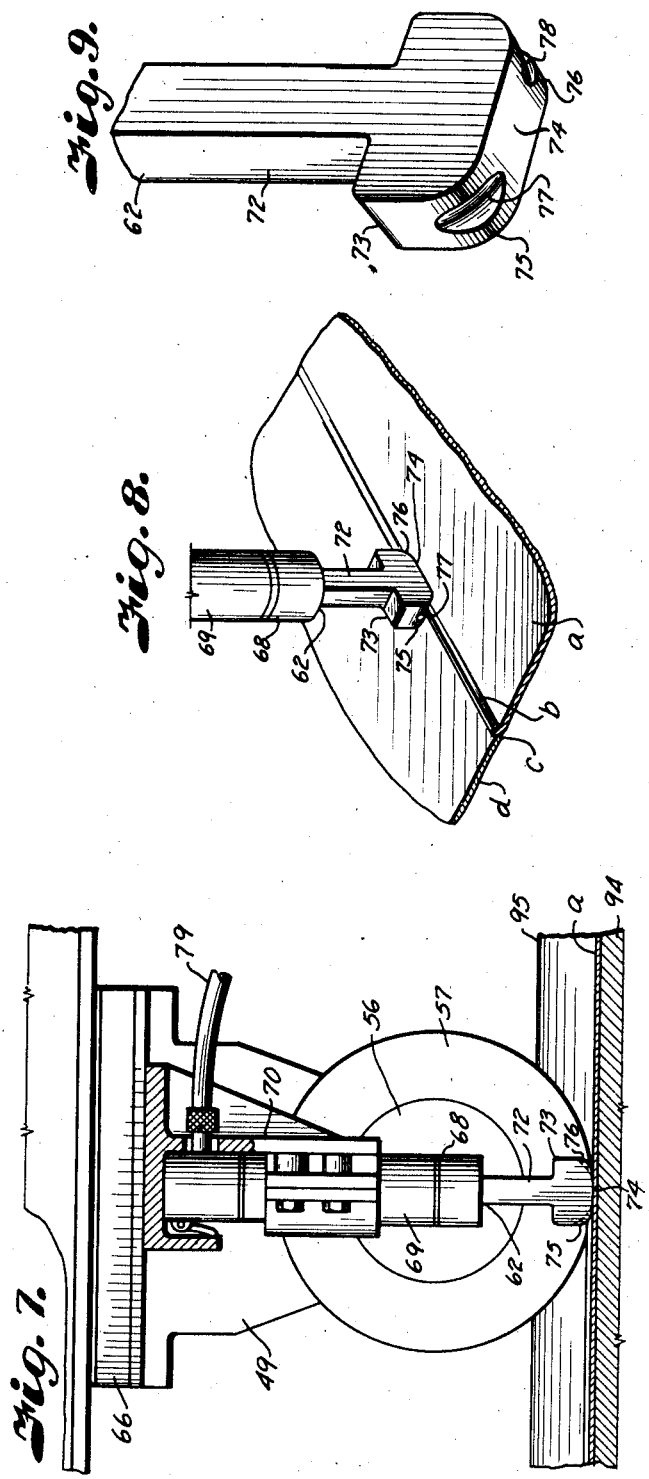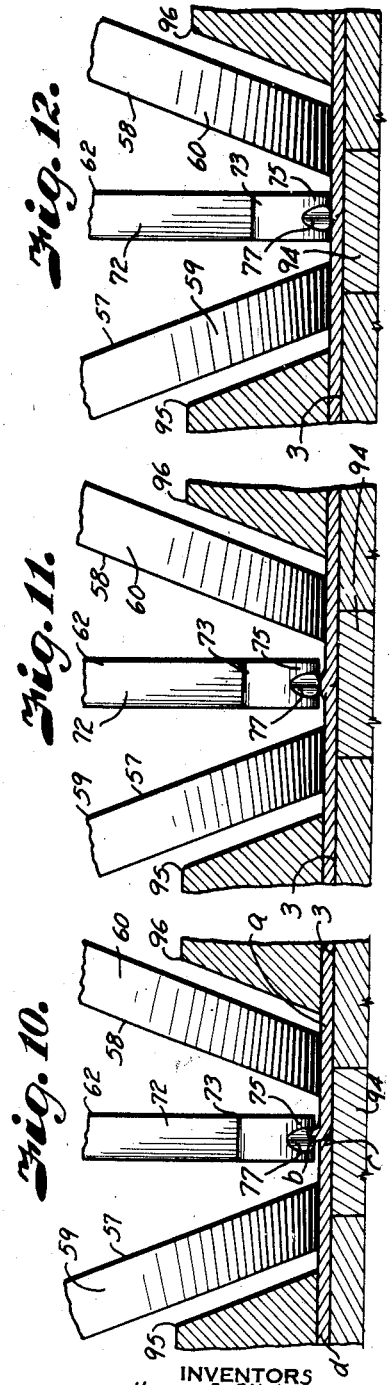

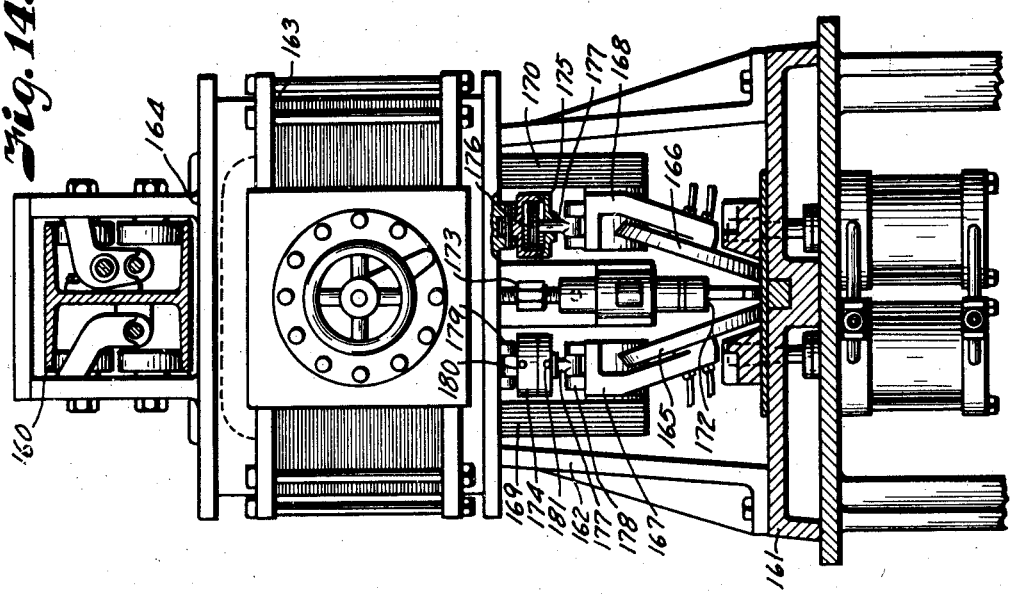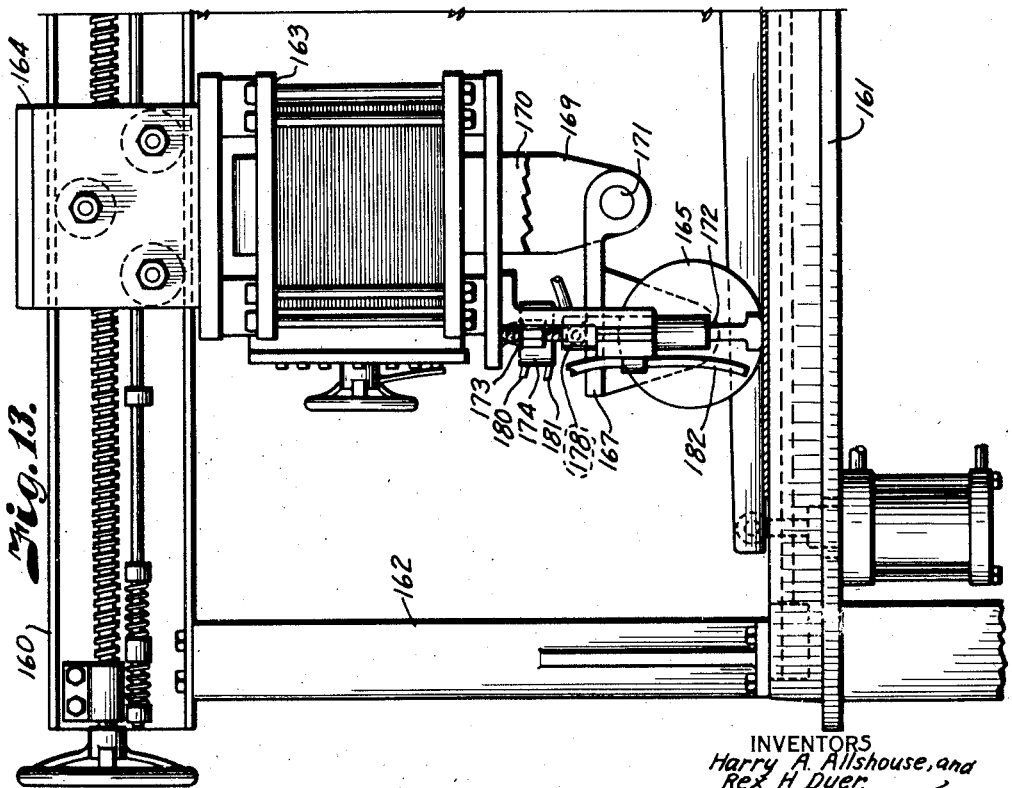

2,356,643

UNITED STATES PATENT OFFICE 2,356,643

WELDING MACHINE

Harry A. Allshouse and Rex H. Dyer, Kansas City, Mo., assignors to Welder Patents Inc., Kansas City, Mo., a corporation of Missouri Application December 15, 1941, Serial No. 423,004

15 Claims. (Cl. 219—4)

This invention relates to electric welding machines, particularly those for welding continuous seams, and has for its principal object to provide a machine of this character wherein the work to be welded is rigidly supported in welding position on the machine and the electrodes are movable along the seam together with a percussion means which acts on the work directly in the path of the welding current passed between the electrodes.

Other objects of the invention are to provide a machine of this character which is of simple design and substantially semi-automatic in operation; and to provide a machine capable of welding metals of various thickness and particularly metals of light gage.

In accomplishing these and other objects of the invention, as hereinafter pointed out, we have provided improved structure, the preferred form of which is illustrated in the accompanying drawings, wherein:

Fig. 1 is a side elevational view of a welding machine constructed in accordance with the present invention, the work being welded and a part of the work supporting table being shown in section.

Fig. 4 is a longitudinal section through one end of the machine showing the work engaging clamp in released position and the electrode carriage supporting track in elevated position to permit removal of the work.

Fig. 5 is a diagrammatic view of the electrical circuits controlling operation of the machine, the switches being shown in position for closing the circuits.

Fig. 6 is a similar view but showing the switches in circuit breaking position.

Fig. 7 is an enlarged section through the electrode carriage particularly illustrating the percussion means for smoothing and levelling the seam.

Fig. 8 is a fragmentary perspective view of the percussion means.

Fig. 9 is an enlarged view of the hammer head of the percussion means.

Figure 3:
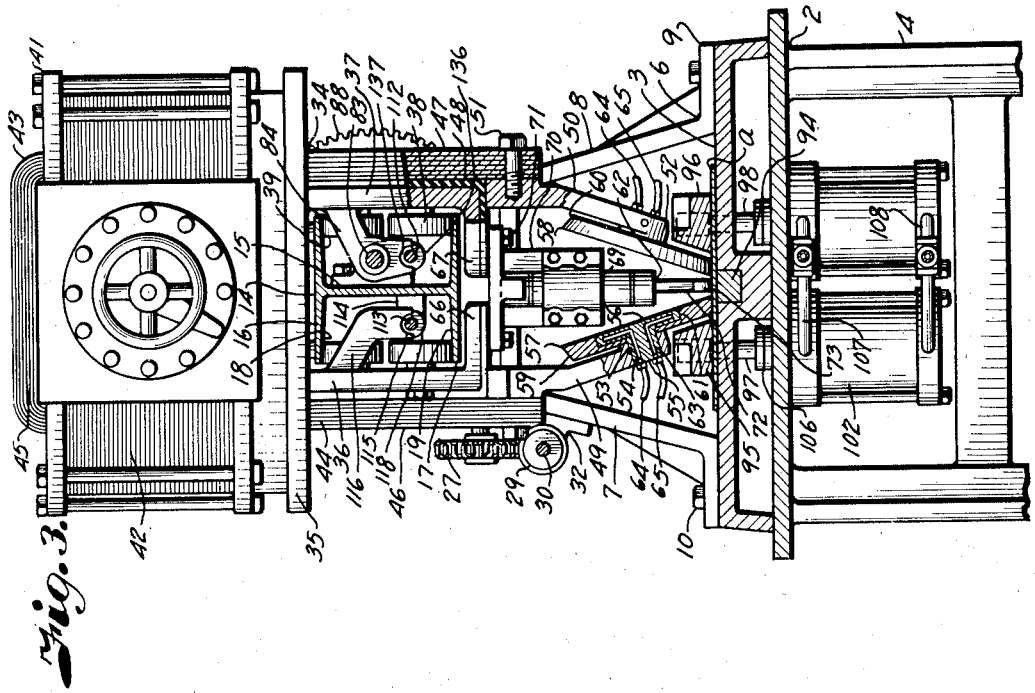
Fig. 3 is a cross-section through the machine.

Figs. 10 to 12 inclusive are diagrammatic views showing formation of a weld.

Fig. 13 is a fragmentary side elevational view of a modified form of the invention.

Fig. 14 is a cross section through the form of machine illustrated in Fig. 13.

Referring more in detail to the drawings:

1 designates a welding machine constructed in accordance with the present invention and which includes a base 2 having a flat, table-like top 3 supported upon legs 4. Mounted on the top 3, at the respective ends thereof, are brackets 5 and 6 each having legs 7 and 8 provided with feet 9 that are secured to the top 3 by fastening devices, such as bolts 10. The upper ends of the legs are connected by cross-bars 11 carrying pairs of vertical posts or guides 12 and 13.

Figure 2:
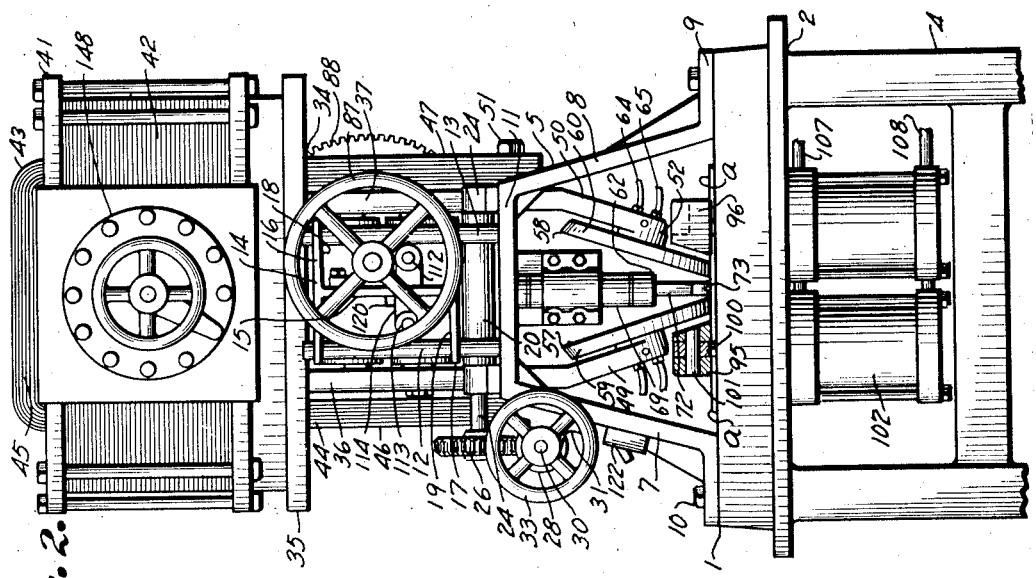
Fig. 2 is an end elevational view of the machine.

Slidably mounted on the posts 12 and 13, for movement to and from the table top 3, is a beam or track member 14 which, in the illustrated instance, is of H formation and has its web portion 15 arranged vertically and extending longitudinally of the machine with the upper and lower flanges 16 and 17 positioned horizontally to form upper and lower wheel engaging surfaces 18 and 19 on the respective sides of the web 15. The ends of the beam or track member are movably supported on cams 20 and 21 that are fixed to transverse shafts 22 and 23 mounted in pairs of bearings 24 and 25 carried on the cross-bars 11 of the end brackets. The ends of the shafts 22 and 23 project through the bearings 24 and carry worm gears 26 and 27 which mesh with worms 28 and 29 that are fixed upon a longitudinal shaft 30. The shaft 30 has its ends rotatably mounted in bearing brackets 31 and 32 supported on the legs 7 of the end brackets 5 and 6 as best shown in Fig. 2. The shaft 30 is rotated by means of a hand-wheel 33 fixed to one end thereof, as best shown in Figs. 1 and 2. With this arrangement it is obvious that when the hand-wheel 33 is manipulated to rotate the shaft 30 the forms 28 and 29 rotate the worm gears 26 and 27 to rotate the shafts 22 and 23 for swinging the cams 20 and 21 into raising and lowering position relatively to the beam or track member, the peripheries of the cams engaging the under face of the lower flange 17. Thus the beam may be raised and lowered on the pairs of guide posts 12 and 13 to raise and lower a welding carriage 34, now to be described.

The welding carriage illustrated in the present drawings includes a horizontal platform 35 having plate-like legs 36 and 37 depending over the sides of the beam 14 to carry pairs of wheels or rollers 38 engaging the track surface 19 of the lowermost flanges 17 and an intermediate upper wheel or roller 39 engaging the track surface 18 of the uppermost flanges 16 as best shown in Figs. 1 and 3. The platform 34 is thus supported for movement longitudinally of the beam or track member, the rollers being suitably journalled on the respective plate-like legs 36 and 37 as indicated at 40.

Carried on the platform 34 is a transformer 41. The transformer 41 includes a primary winding 42 and a secondary 43, the secondary 43 consisting of a plurality of laminations 44 bent to provide a horizontal bar portion 45 extending across the transformer and depending leg portions 46 and 47 arranged alongside of the legs 36 and 37 but insulated therefrom by suitable insulation as indicated at 48, Fig. 3. The leg portions 46 are of sufficient length to extend below the legs 36 and 37 for mounting electrode supporting arms 49 and 50, the arms being fixed to the legs 46 and 47 of the secondary by fastening devices such as cap-screws 51 which extend through suitable openings in the laminations and into threaded sockets at the upper ends of the arms. The lower ends 52 of the arms converge inwardly toward the top of the table and have openings 53 mounting the shanks 54 of spindle members 55, the spindle members having disk-like heads 56. Journalled on the spindle members are wheel-type electrodes 57 and 58 respectively, having bevelled peripheral faces 59 and 60 arranged to engage the work carried on the table top 3 and to roll smoothly thereover as the welding carriage 34 is carried along the beam. The disk-like heads of the spindle members are engaged in recesses 61 of the electrodes to retain the electrodes for rotation about fixed axes. With this arrangement the lower portions of the disks or wheels are in position to engage the marginal portions of a seam to be welded while the upper portions are spaced apart to accommodate a percussion device 62 therebetween, later described.

In order to cool the electrodes, the spindle members 55 are preferably provided with passageways 63 having connection with flexible conduits 64 and 65 which circulate a cooling medium to carry away the heat accumulating in the electrodes.

The lower edges of the plate-like legs 36 and 37 terminate in inwardly extending flanges 66 and 67 extending under the lower flanges 17 of the track member 14 for supporting the percussion device 62. In the illustrated instance the percussion device comprises a pneumatic hammer 68 having an air cylinder 69 thereof mounted on a plate 70 which is fixed to the flanges 66 and 67 by fastening devices 71, as best shown in Fig. 3. The percussion device includes a reciprocating shank 72 slidable in the cylinder 69 and provided with a foot 73 which is best illustrated in Figs. 8 and 9. The foot 73 has a flat sole 74 (see Figs. 7, 8 and 9) adapted to engage the work, and upwardly rounding ends 75 and 76 that are provided with groove portions 77 and 78 for working down a flange formed on one of the members to be welded as the hammer moves thereover. The percussion means is supplied with an actuating medium, such as compressed air, through a hose 79, having connection with a control valve 80 which is connected by a pipe 81 with a suitable source of supply. The valve 80 is operated by a solenoid 82 which is connected with the electric control circuits, as later described.

The carriage is moved along the track member by means of a screw-shaft 83 extending longitudinally of the track and having threaded engagement with an arm 84 extending inwardly from the leg 37 of the carriage. The ends of the shaft are journalled in bearing brackets 85 and 86 fixed to the ends of the web 15 as best shown in Fig. 1. The end of the screw-shaft adjacent the hand-wheel 33 is provided with a hand-wheel 87 by which the shaft may be manually rotated. The opposite end of the shaft carries a gear wheel 88 that is adapted to be connected with the shaft by means of a clutch collar 89 engageable with a clutch face 90 on the gear.

Mounted on the upper flange of the beam member, adjacent the end carrying the gear 88, is a reversible motor 91 having a pinion 92 on the armature shaft 93 thereof meshing with the gear wheel 88 so that the screw-shaft may be rotated in either direction under power of the motor whenever the clutch collar 89 is engaged with the clutch face of the gear wheel 88.

Inlaid in the table top 3, directly under the line of the weld, is an insert 94 formed of a metal which prevents sticking of the work to the table top.

In welding flat sheets, and particularly those of light gage, we find it desirable to clamp the sheets in welding position on the table top. This is effected by longitudinal bars 95 and 96 extending longitudinally across the top of the table and spaced apart a sufficient distance to allow passage of the electrode wheels. The ends of the bars are carried on piston rods 97 and 98 reciprocable through openings 99 in the table top 3 and having heads 100 connected with the ends of the bars by wrist pins 101. Suspended below the table top are cylinders 102 carrying pistons 103 fixed to the ends of the respective piston rods. The lower heads of the cylinders are closed by plates 104 and the upper ends by plates 105 which are provided with stuffing boxes 106 to seal about the piston rods. A fluid pressure medium is admitted to the respective ends of the cylinders by pipes 107 and 108 having common connections through a four-way valve 109 which is supplied with pressure medium through a pipe 110 and which is allowed to exhaust through a pipe 111. When the valve is set to admit pressure medium to the pipes 108, pressure fluid is admitted to the lower end of the cylinders 102 and raises the pistons 103 and lifts the clamping bars 95 and 96 from engagement with the work. When the valve 109 is set in its other position, the pressure medium is allowed to exhaust through the pipes 108 and pressure medium is applied to the upper ends of the cylinders through the pipes 107 to bring the clamping bars into engagement with the work.

In order to control movement of the welding carriage when the electrodes move off of the work, the web 15 of the beam or track member 14 carries longitudinal rods 112 and 113 on the respective sides thereof. The rod 113 is slidable in bearing brackets 114 fixed to the beam 14 near the respective ends thereof and extends through a yoke-like notch 115 of an arm 116 depending inwardly from the leg 36 of the carriage, as best shown in Fig. 3. Adjustably fixed on the rod, at the limits of movement of the carriage, are collars 117 and 118 which are adapted to be engaged by the arm 116 to effect shifting of the rod when the arm engages the respective collars. Fixed on one end of the rod is a collar 119 which engages the trip 120 of a toggle switch 121 so that when the rod is shifted in one direction, as when the arm on the carriage engages the collar 117, the switch arm is moved in one direction to open the motor circuit when the motor is rotated in one direction, and when the rod is moved in the opposite direction, as when the arm of the carriage engages the collar 118, the trip of the switch 121 is moved in the opposite direction to stop the motor 91 and establish a connection to reverse rotation thereof upon closure of a starting switch 122.

The welding current is controlled by the rod 112. One end of this rod is slidable in a bearing 123 projecting from the web 15 of the track member 14 and its opposite end is connected by a pin 124 with the central joint of toggle links 125 and 126. The lower toggle link 126 is mounted on a pin 127 fixed to the web of the track member and the outer end of the upper link 125 is connected with one arm of a bell-crank lever 128 through a pin 129. The other arm 130 of the bell-crank lever carries a contact 131 adapted to engage a contact 132 on an arm 133 which is pivotally mounted on a pin 134 carried by the web 15 of the track member 14. The arm 130 is so arranged that when the toggle links are in dead center position, as shown in Fig. 5, the contacts 131 and 132 are engaged so that a welding circuit is established to the electrode wheels 57 and 58. When the toggle is swung to either side of dead center position, the bell-crank lever is actuated to open the circuit. This is effected by limit collars 135 and 136 substantially registering with the collars 117 and 118 on the rod 113 previously described, and adapted to be engaged by a notched end 137 of the bracket arm 84. The rod 112 is normally retained in position to close circuit by springs 138 and 139 sleeved on the rod and having one of their ends engaging the bearing 123 and their opposite ends engaging collars 140 and 141 fixed to the shaft, as shown in Fig. 5. Thus when a carriage is moving in one direction and the arm thereof engages the collar 135, the rod 112 is shifted, compressing the spring 139 and moving the toggle links 125 and 126 to circuit breaking position. When the carriage moves away from the collar 135 in the direction of the collar 136, the spring 139 operates to shift the rod to the right (Fig. 5) which rocks the bell-crank in an anticlockwise direction to close the circuit. When the arm 84 of the carriage reaches the collar 136 the rod is shifted again, this time, breaking the toggle to the right, compressing the spring 138 and moving the toggle in a clockwise direction to open the circuit. When the movement of the carriage is reversed, the spring 138 again shifts the rod, this time to the left, to move the toggle levers to dead center position, again closing the welding circuit.

The circuits connecting the respective mechanisms are best shown in Figs. 5 and 6. Current is supplied through service conductors 142 and 143 to the primary winding through branch conductors 144 and 145, the conductor 145 being connected with the bell-crank lever 128 by a branch conductor 146 and the other contact 132 is connected with the conductor 143 through a conductor 147 cooperating with the branch 146 to form a continuation of the conductor 145. Thus when the contacts are in engaging relation, current is supplied to the primary of the transformer through a rheostat 148, shown in Figs. 2 and 3. The conductor 145 also connects with the solenoid 82 and circuit is completed through the solenoid to the conductor 142 by a conductor 149.

Current is also supplied from the conductors 142 and 143 to the switch 122 by means of conductors 150 and 151. The starting switch 122 is connected with the switch 121 through conductors 152, 153 and 154 and the switch 121 is connected with the motor 91 through conductors 155 and 156. The switches 121 and 122 are of a type so that current to the motor 91 may be established or broken by manipulation of either switch.

In welding sheets together, the marginal edge of one sheet $a$ is provided with a laterally turned flange $b$ against which the mating edge $c$ of the adjacent sheet $d$ abuts. In applying the sheets to the table top 3, the valve 109 is adjusted so as to admit pressure medium below the pistons and exhaust pressure medium above the pistons, thereby lifting the clamping bars 95 and 96 from the table. The sheets $a$ and $d$ are then slid under the clamping bars with the edge $c$ and flange $b$ thereof in abutting contact, as shown in Fig. 10, and with the flange $b$ arranged directly under the path of the hammer 68. The clamping bars 95 and 96 are then brought into clamping engagement with the marginal edges of the sheets $a$ and $d$ by changing setting of the valve 109 so that the pressure medium is exhausted from the lower ends of the cylinders 102 and admitted to the upper ends of the cylinders. When in non-welding position the carriage is at one or the other ends of the table with the electrode wheels 57 and 58 out of contact with the sheets to be welded. For example, assuming that the carriage is in the position shown in Fig. 1, the arm 116 has engaged the collar 118 and the switch 120 is open between the closed position of the switch 122 and the motor 91, however, when the switch 122 is swung to its other position, circuit is closed to the motor 91 so that the motor begins to rotate the screw-shaft 83 in proper direction to begin feed of the welding carriage toward the opposite end of the machine. However, before the electrode wheels 57 and 58 contact the sheets $a$ and $d$ the hand-wheel 33 is rotated to lower the electrode wheels into contact with the work. As soon as the arm 84 on the carriage has moved away from the collar 136 the spring 138 comes into play to shift the rod 112 and allow the toggle links 125 and 126 to move to switch closing position. Current then flows to the primary 42 of the transformer 41 and to the solenoid valve 80. A secondary or welding current is then generated in the secondary 43 so that current flows through the contacting portions of the sheets at the point of contact of the electrode wheels therewith. Upon opening of the valve 80 pressure medium is admitted to the percussion device 62 to effect reciprocation of the hammer 68. The current flowing across the seam between the electrode wheel heats the metal, including the upturned flange $b$ and the hammer works on the upturned flange to effect compaction of the weld, as shown in Fig. 11. After the face of the hammer moves along the flange, the flat portion comes into contact therewith to reduce the thickness of the seam to the thickness of the metal sheets as shown in Fig. 12. The weld is made progressively across the width of the sheets until the electrode wheels move off the opposite side when the arms 84 and 116 engage the collars 117 and 135, shifting the rods 113 and 112 so that the motor circuit is broken at the switch 121 and the toggle links are moved to switch opening position, thereby interrupting flow of current to the primary winding of the transformer and to the solenoid, suspending the welding current in the secondary and flow of pressure medium to the percussion means. The position of the valve 109 is then changed so that the pressure above the pistons is exhausted and pressure medium is admitted to the lower sides of the pistons for raising the clamping bars from engagement with the sheets.

The hand-wheel 33 is manipulated to cause raising of the electrode wheels and prevent their engagement with the table. The machine is then ready for making another weld in the same manner as above pointed out, with the exception that when the switch 122 is moved to its original position, circuit is established to reverse the motor 91 so that the shaft is rotated in the opposite direction to feed the carriage in reverse direction across the sheets to be welded.

The modified form of the invention shown in Figs. 13 and 14 is substantially the same as that in the first form with the exception that the track member 160 has fixed support from the table-like top 161 by end members 162. The welding head including the transformer 163 is suspended from a carriage 164 that is movable along the track 160 similar to the carriage previously described. In this arrangement the transformer operates below the track and carries electrode wheels 165 and 166 which are rotatably supported on arms 167 and 168 pivotally mounted on the depending ends 169 and 170 of the secondary of the transformer by pins 171 as indicated in Fig. 13. The arms 167 and 168 are spaced apart to accommodate the hammer 172 that is adjustably supported from the frame of the transformer, as indicated at 173. The electrode wheels are retained in firm contact with the work to be welded by fluid pressure introduced into cylinders 174 and 175 and in which are mounted pistons 176 having rods 177 pivotally connected with ears 178 on the arms 167 and 168. The upper ends of the cylinders are pivotally connected with similar ears 179 depending from the frame of the transformer. A compressible fluid such as air is introduced to the respective ends of the cylinders to act on the respective sides of the pistons through pipes 180 and 181, the air being selectively admitted through the respective pipes under control of a suitable valve (not shown). The work is retained in position on the table in the same manner as in the first form of the invention and the transformer carriage is operated by a similar mechanism to move the electrode wheels across the work and effect a weld. When the wheels are to be moved into contact with the work, air is admitted to the cylinders 174 and 175 to act against the upper faces of the pistons to retain the wheels in yielding contact with the work so that they may move over any irregularities and maintain constant electrical contact therewith. To raise the wheels after they have travelled across the work, air is shut off to the upper ends of the cylinders and is admitted to the lower ends of the cylinders to act on the under face of the pistons to lift the wheels from the work. If desired, the metal at the point of the weld may be preheated or kept within a non-oxidizable zone by means of gas discharged from a nozzle 182 which is carried by the welding head in front of the electrode wheels (Fig. 13).

From the foregoing it is obvious that we have provided a welding machine which is semi-automatic in operation and capable of performing a weld wherein the metal of the weld is reduced to the surface of the material being welded.

What we claim and desire to secure by Letters Patent is:

1. A welding machine including, a work support, clamping means arranged to clamp work to be welded on the support, a welding mechanism, a carriage supporting the welding mechanism, means supporting the carriage for movement of the welding mechanism across the work support, pneumatic percussion means supported for movement with the welding mechanism, means for controlling flow of current to the welding mechanism, means for controlling an air supply to said percussion means, and means connected with each of said control means and located in the path of a part movable with the carriage to actuate each of said control means.

2. A welding machine including, a work support, clamping means arranged to clamp work to be welded on the support, a welding mechanism, a carriage supporting the welding mechanism for movement across the work support, percussion means supported by said carriage and arranged to smooth the weld effected by said welding mechanism, a motor for reciprocating the carriage across the work support, and means for energizing the motor including means for effecting actuation of the percussion means.

3. A welding machine including, a work support, clamping means arranged to clamp work to be welded on the support, a welding mechanism, a carriage supporting the welding mechanism for movement across the work support, percussion means supported by said carriage and arranged to smooth the weld effected by said welding mechanism, a motor for reciprocating the carriage across the work support, means for energizing the motor including means for effecting actuation of the percussion means, and control means having engagement with the carriage at selected positions of said carriage for stopping the motor including said percussion means.

4. A welding machine including, a work support, a pair of laterally spaced clamping members coextensive with a seam to be welded and having arrangement to clamp the work against the work support on the respective sides of the seam to be welded, pressure actuated means carried by the support for moving said clamping members into and out of clamping position, a track member carried above the work support in parallel relation with the clamping members, a carriage mounted for movement along the track member, electrodes on the carriage arranged to engage the work at points intermediate said clamping members and on the respective sides of the seam, percussion means on the carriage and operable on the seam backed by said work support to smooth the weld effected by said electrodes, means for moving the carriage along the track member, and means for rendering said moving means effective including said percussion means.

5. A welding machine including, a work support, a pair of laterally spaced clamping members arranged to engage the work on the respective sides of a weld to be effected, cylinders carried by the support, pistons slidable in the cylinders, means connecting the pistons with the clamping members, means supplying a pressure fluid to said cylinders for moving said clamping members into and out of clamping position, a track member carried above the work support, a carriage mounted for movement along the track member, electrodes on the carriage arranged to engage the work, percussion means on the carriage and operable on the work intermediate said electrodes, and means for moving the carriage along the track member.

6. A welding machine including, a work support, a pair of laterally spaced clamping members arranged to engage the work on the respective sides of a weld to be effected, pressure actuated means carried by the support for moving said clamping members into and out of clamping position, a track member carried above the work support, a carriage mounted for movement along the track member, electrodes on the carriage arranged to engage the work, percussion means on the carriage and operable on the work intermediate said electrodes, means for moving the carriage along the track member, means for rendering said moving means effective including said percussion means, means supplying a welding current to the electrodes, a switch controlling said current supply, and means for opening said switch at selected predetermined limits of movement of the carriage.

7. A welding machine including, a work support, a pair of laterally spaced clamping members arranged to engage the work on the respective sides of a weld to be effected, means carried by the support for moving said clamping members into and out of clamping position, a track member carried above the clamping members, a carriage mounted for movement along the track member, electrodes on the carriage arranged to engage the work, percussion means on the carriage and operable on the work intermediate said electrodes, means for moving the carriage along the track member, means for rendering said moving means effective including said percussion means, means supplying a welding current to the electrodes, a switch controlling said current supply, and means for opening said switch at selected predetermined limits of movement of the carriage.

8. A welding machine including, a work support, a pair of laterally spaced clamping members arranged to engage the work on the respective sides of a weld to be effected, pressure actuated means carried by the support for moving said clamping members into and out of clamping position, a track carried above the work support, a carriage mounted for movement along the track, electrodes on the carriage arranged to engage the work, percussion means on the carriage and operable on the work intermediate said electrodes, means for moving the carriage along the track, means for rendering said moving means effective, means supplying a welding current to the electrodes, a switch controlling said current supply, and means for opening said switch at selected predetermined limits of movement of the carriage.

9. A welding machine including, a work support, a pair of laterally spaced clamping members arranged to engage the work on the respective sides of a weld to be effected, means carried by the support for moving said clamping members into and out of clamping position, a track member carried above the work support, a carriage mounted for movement along the track member, electrodes on the carriage arranged to engage the work, percussion means on the carriage intermediate the electrodes and operable on the work in the path of the current passed between said electrodes, means for moving the carriage along the track member, means on the carriage supplying a welding current to the electrodes, and means for raising and lowering the track member with respect to the support.

10. A welding machine including, a table-like work support, a beam member adjustably mounted above the table-like support, a carriage mounted for reciprocation on the beam member, a shaft having ends journalled on the beam member and having threaded connection with said carriage, means for rotating the shaft to effect movement of the carriage, welding means on the carriage including electrode wheels arranged to engage work sheets carried on the table-like work support, percussion means on the carriage intermediate the electrode wheels, means for raising and lowering the beam member relative to the table-like work support, and means on the beam member adapted to be engaged by the carriage for stopping rotation of said shaft.

11. A welding machine including, a table-like work support, supporting members at opposite ends of the table-like work support, guides on said supporting members, a beam member having movable support on said guides, cams carried by said supporting members and arranged to engage said beam member, actuating means for the cams, a carriage mounted for reciprocation on the beam member, a shaft having ends journalled on the beam member and having threaded connection with said carriage, means for rotating the shaft to effect movement of the carriage, welding means on the carriage including electrode wheels arranged to engage work sheets carried on the table-like work support, and percussion means on the carriage intermediate the electrode wheels.

12. A welding machine including, a work support, laterally spaced clamping members arranged to engage the work on the respective sides of a weld to be effected, pressure actuated means carried by the support for moving said clamping members into and out of clamping position, a track extending parallel with the weld to be effected, a carriage mounted for movement along the track, electrodes on the carriage arranged to engage the work, percussion means on the carriage and operable on the work intermediate said electrodes, means for moving the carriage along the track, means for rendering said moving means effective, means supplying a welding current to the electrodes, a switch controlling said current supply, and means for opening said switch after selected predetermined limited movement of the carriage.

13. A welding machine including, a work support, a transformer, a carriage supporting the transformer for movement across the work support, means for moving the carriage, a pair of spaced electrode wheels having electrical connection with the transformer, and means separately and movably mounting the electrode wheels on the transformer for movement to and from the work support independently of the transformer.

14. A welding machine including, a work support, a transformer, a carriage supporting the transformer for movement across the work support, a pair of spaced electrode wheels having electrical connection with the transformer, means pivotally mounting the electrode wheels on the transformer, and means for moving the electrode wheels on said pivotal means for raising and lowering the wheels to and from the work support.

15. A welding machine including, a work support, a transformer, a carriage supporting the transformer for movement across the work support, a pair of spaced electrode wheels having electrical connection with the transformer, means pivotally mounting the electrode wheels on the transformer, and fluid pressure means for yieldingly retaining the wheels in welding contact with work carried by the work support.

HARRY A. ALLSHOUSE.
REX H. DYER.